(12) United States Patent
Chang et al.

(10) Patent No.: US 12,540,917 B2
(45) Date of Patent: Feb. 3, 2026

(54) ELECTROCHEMICAL ANALYSIS METHOD OF RECOGNIZING INTERFACIAL LAYER WITH DEPLETED WATER ON POSITIVELY ELECTRIFIED ELECTRODE IN WATER-IN-SALT

(71) Applicant: IUCF-HYU (Industry-University Cooperation Foundation Hanyang University), Seoul (KR)

(72) Inventors: Jinho Chang, Seoul (KR); Sungjun Son, Seoul (KR); Jeongmin Yeo, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 302 days.

(21) Appl. No.: 18/233,755

(22) Filed: Aug. 14, 2023

(65) Prior Publication Data

US 2024/0060932 A1    Feb. 22, 2024

(30) Foreign Application Priority Data

Aug. 16, 2022  (KR) .................. 10-2022-0102062
Jan. 30, 2023  (KR) .................. 10-2023-0011973

(51) Int. Cl.
*G01N 27/416*   (2006.01)
*G01N 27/48*    (2006.01)
(Continued)

(52) U.S. Cl.
CPC ..... *G01N 27/4168* (2013.01); *G01N 27/4161* (2013.01); *G01N 27/48* (2013.01); *G01R 31/382* (2019.01); *G01R 31/396* (2019.01)

(58) Field of Classification Search
CPC .......... G01N 27/4168; G01N 27/4161; G01N 27/48; G01R 31/382; G01R 31/3835; G01R 31/3842; G01R 31/396
See application file for complete search history.

(56) References Cited

FOREIGN PATENT DOCUMENTS

| JP | 2022049212 A | 3/2022 |
|---|---|---|
| KR | 20210135262 A | 11/2021 |
| KR | 1020220084079 | 6/2022 |

OTHER PUBLICATIONS

Chen et al., "Adding salt to expand voltage window of humid ionic liquids," Nature Communications | (2020) 11:5809 | https://doi.org/10.1038/s41467-020-19469-3 |, including supplementary information (Year: 2020).*

(Continued)

*Primary Examiner* — Alexander S Noguerola
(74) *Attorney, Agent, or Firm* — CANTOR COLBURN LLP (57) ABSTRACT

Disclosed is an electrochemical analysis method for recognizing whether a hydrophobic interfacial layer of a positively electrified electrode is formed, the analysis method uses a chloride ion in a battery system including a water-in-salt electrolyte and said electrode, wherein the water-in-salt electrolyte includes an aqueous solvent and a salt, and a ratio of the weight of the salt to the weight of the aqueous solvent is about 1 or more, and in the analysis method, a solution containing chloride ions is added to a water-in-salt electrolyte, and if two types of oxidation-reduction reactions related to chlorine ions are confirmed in a voltage applied state, it is determined that a hydrophobic interfacial layer is formed on the positively electrified electrode.

13 Claims, 8 Drawing Sheets

(51) Int. Cl.
    *G01R 31/382*    (2019.01)
    *G01R 31/396*    (2019.01)

(56) References Cited

OTHER PUBLICATIONS

Qun et al., "Characteristics of Electric Double Layer in Different Aqueous Electrolyte Solutions for Supercapacitors," Wuhan University Journal of Natural Sciences, 2012, vol. 17 No. 3, 200-204 (Year: 2012).*

Jenel Vatamanu, et al., "Ramifications of Water-in-Salt Interfacial Structure at ChargedElectrodes for Electrolyte Electrochemical Stability", J. Phys. Chem. Lett., (2017), vol. 8, pp. 4362-4367.

Jiaxin Zheng, et al., "Understanding Thermodynamic and Kinetic Contributions in Expanding the Stability Window of Aqueous Electrolytes", Chem, vol. 4, pp. 2872-2882, Dec. 13, 2018.

Joonhyung Lim, et al., "Nanometric Water Channels in Water-in-Salt Lithium Ion BatteryElectrolyte", J. Am. Chem. Soc., (2018), vol. 140, pp. 15661-15667.

Liumin Suo, et al., "Water-in-salt" electrolyte enables high-voltage aqueous lithium-ion chemistries, Nov. 20, 2015, (vol. 350, Issue 6263), pp. 938-944.

Ruixian Zhang, et al., "Potential-Dependent Layering in the Electrochemical Double Layerof Water-in-Salt Electrolytes", ACS Appl. Energy Mater., (2020), vol. 3, pp. 8086-8094.

Shan Guo, et al., "Cathode Interfacial Layer Formation via in Situ Electrochemically Charging in Aqueous Zinc-Ion Battery", ACS Nano, (2019), vol. 13, pp. 13456-13464.

Yong Zhang, et al., "Water-in-Salt LiTFSI Aqueous Electrolytes. 1. Liquid Structure fromCombined Molecular Dynamics Simulation and Experimental Studies", J. Phys. Chem. B (2021), vol. 125, pp. 4501-4513.

Dubouis, "Chasing Aqueous Biphasic Systems from Simple Salts by Exploringthe LiTFSI/LiCl/H2O Phase Diagram"; ACS Cent. Sci. 2019, 5, 640-643; 4 pages.

Turgeman, et al., "A cost-effective water-in-salt electrolyte enables highly stable operation of a 2.15-V aqueous lithium-ion battery"; Cell Reports Physical Science 3, 100688; Jan. 19, 2022; 19 pages.

* cited by examiner

ELECTROCHEMICAL ANALYSIS METHOD OF RECOGNIZING INTERFACIAL LAYER WITH DEPLETED WATER ON POSITIVELY ELECTRIFIED ELECTRODE IN WATER-IN-SALT

CROSS-REFERENCE TO RELATED APPLICATION

This application claims priority to and the benefit of Korean Patent Application No. 10-2023-0011973 filed in the Korean Intellectual Property Office on Jan. 30, 2023, and Korean Patent Application No. 10-2022-0102062 filed in the Korean Intellectual Property Office on Aug. 16, 2022, the entire contents of which are incorporated herein by reference.

BACKGROUND OF THE INVENTION

(a) Field of the Invention

It relates to an electrochemical analysis method for recognizing an interfacial layer with depleted water of a positively electrified electrode in a water-in-salt electrolyte.

(b) Description of the Related Art

Water-in-salt electrolyte (WiSE) is an aqueous medium containing a highly concentrated electrolyte and is considered a promising electrolyte for various battery systems. In order to increase a kinetic overpotential of the water oxidation reaction in a water-in-salt electrolyte system, it is important to form a hydrophobic interfacial layer (IFL) on the surface of a positively electrified electrode. That is, the presence or absence of a hydrophobic interfacial layer formed at the interface between a positively electrified electrode and an electrolyte is a decisive factor for the operation of the water-in-salt electrolyte system. Therefore, it is an important task to recognize the nature of the interfacial layer formed at the interface between the positively electrified electrode and the electrolyte.

The interfacial layer (IFL) is a double layer formed by arranging ions or the like on an electrode to which a voltage is applied, and is a layer that disappears when a potential difference is eliminated. This is a concept distinct from SEI (Solid Electrolyte Interphase), which has been studied in the past. SEI is a layer with ion conductivity and electronic insulation properties formed by a decomposition (reduction) of electrolyte during initial charge and discharge processes of a battery, and is a type of film that remains even when the potential difference disappears, that is, a voltage applied to the electrode disappears. In the meantime, many analyses of stable layers such as SEI have been made, but the interfacial layer exists only under voltage conditions and is expected to have a thickness of less than 1 nm, so there is a limit to practical detection, and existing studies are theoretically access is limited. In Non-Patent Document 1, an attempt has been made to analyze the interfacial layer through atomic force microscopy (AFM) and surface-enhanced infrared absorption spectroscopy, but this method has limitations in that the analysis method is difficult, intuitive confirmation is difficult, and the method is limited to microelectrodes.

[Non-Patent Document 1] CS Appl. Energy Mater. 2020, 3, 8, 8086-8094

SUMMARY OF THE INVENTION

A simple, intuitive, and economical electrochemical analysis method is provided as a method for confirming the water-excluded hydrophobic interfacial layer of the positively electrified electrode in a water-in-salt electrolyte system. In an embodiment, an electrochemical analysis method for recognizing whether a hydrophobic interfacial layer of a positively electrified electrode is formed using a chloride ion in a battery system including a water-in-salt electrolyte and an electrode, wherein the water-in-salt electrolyte includes an aqueous solvent and a salt, and a ratio of the weight of the salt to the weight of the aqueous solvent is about 1 or more, and in the analysis method, a solution containing chloride ions is added to a water-in-salt electrolyte, and if two types of oxidation-reduction reactions related to chloride ions are confirmed in a voltage applied state, it is determined that a hydrophobic interfacial layer is formed on the positively electrified electrode.

Formation of the hydrophobic interfacial layer with depleted water of the positively electrified electrode is an important factor determining whether the water-in-salt electrolyte battery system can be stably operated. Therefore, it is an essential task to recognize the nature of the interfacial layer formed in the process of manufacturing and researching the battery system, especially in relation to water. The analysis method according to an embodiment is a method capable of recognizing what type of interfacial layer is formed on a positively electrified electrode in a water-in-salt electrolyte battery system, and specifically, it is an electrochemical analysis method capable of determining whether a hydrophobic interfacial layer with depleted water is formed at the interface between the positively electrified electrode and the water-in-salt electrolyte. This analysis method is a very simple and intuitive method, and can be used in various battery systems to which a water-in-salt electrolyte is applied.

DETAILED DESCRIPTION OF THE EMBODIMENTS

Hereinafter, specific embodiments will be described in detail so that those skilled in the art can easily implement them. However, this disclosure may be embodied in many different forms and is not construed as limited to the example embodiments set forth herein.

As used herein, "combination thereof" means mixture, laminates, composites, copolymers, alloys, blends, reaction products, and the like of the constituents.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawing, the thickness is shown enlarged to clearly express the various layers and regions. It will be understood that when an element such as a layer, film, region, or substrate is referred to as being "on" another element, it can be directly on the other element or intervening elements may also be present. In contrast, when an element is referred to as being "directly on" another element, there are no intervening elements present. "Layer" herein includes not only a shape formed on the whole surface when viewed from a plan view, but also a shape formed on a partial surface.

Herein, "or" is not to be construed as an exclusive meaning, for example, "A or B" is construed to include A, B, A+B, and the like.

In an embodiment, provided is an electrochemical analysis method for recognizing whether a hydrophobic interfacial layer of a positively electrified electrode is formed using a chloride ion in a battery system including a water-in-salt electrolyte and an electrode.

Herein, the battery system is a concept encompassing an electrochemical device, and may be interpreted as a concept including a rechargeable battery such as a rechargeable lithium battery or a lead acid battery, a redox flow battery, a fuel cell, a capacitor, an electrolysis device, and the like.

The water-in-salt electrolyte contains an aqueous solvent and a salt and can be referred to as a high-concentration aqueous electrolyte, and specifically means that a ratio of the weight of the salt to the weight of the aqueous solvent is about 1 or more. The ratio of the weight of the salt to the weight of the aqueous solvent in the water-in-salt electrolyte may be about 1 or more and about 30 or less, or about 1 or more and about 20 or less. In the water-in-salt electrolyte, the relative number of water molecules decreases and the number of ions increases, thereby highlighting an interaction between cations and anions, increasing an energy barrier of the oxidation-reduction reaction of water, and expanding a electrochemical stability window. This water-in-salt electrolyte is considered as an electrolyte that can overcome the limitations of conventional aqueous electrolytes.

The aqueous solvent may include water, an alcohol-based solvent, or a combination thereof, and may mean, for example, a solvent containing about 80 volume % or more of water. The salt is a material that dissolves in a solvent and acts as a source of ions and promotes movement of ions between the positive electrode and the negative electrode, and can be referred to as a material that enables the operation of the battery system. The salt may be applied without limitation as long as it can constitute a water-in-salt electrolyte, and may be, for example, an alkali metal salt such as sodium salt or lithium salt, for example, lithium bis(trifluoromethanesulfonyl)imide (LiTFSI), lithium trifluoromethanesulfonate (LiOTf), or a combination thereof. The molality of the water-in-salt electrolyte may vary depending on the type of salt to be applied, and may be, for example, about 5 m to about 50 m, about 8 m to about 40 m, or about 10 m to about 30 m.

Hereinafter, the interfacial layer (IFL) refers to a layer formed on the surface of a positively electrified electrode, that is, an interface between a positively electrified electrode and an electrolyte, and should be understood as a concept different from SEI reported to be formed on the surface of a conventional negatively electrified electrode. The positively electrified electrode may be expressed as a positively charged electrode, and may be, for example, a positive electrode or a cathode. The positively electrified electrode may be, for example, an electrode to which a potential of about +1 V or more is applied, and specifically, an electrode to which a potential of about +1 V to about +5 V is applied.

The interfacial layer is a layer that exists only under voltage conditions and disappears when the potential difference disappears, and it is almost impossible to capture it because its thickness is very thin at the level of 10 nm or less or 1 nm or less. Therefore, in order to recognize the nature of the interfacial layer or to determine whether or not a hydrophobic interfacial layer with depleted water is formed, there was a limit to using a complicated analysis method. On the other hand, the analysis method according to an embodiment may be a method for intuitively determining whether a hydrophobic interfacial layer is formed using chloride ions very simply. In the method for recognizing a hydrophobic interfacial layer according to an embodiment, if a solution containing chloride ions is introduced into a battery system including a water-in-salt electrolyte and an electrode, and two types of oxidation-reduction reactions related to chloride ions are confirmed in a state in which a voltage is applied, it is determined that a hydrophobic interfacial layer is formed on the positively electrified electrode.

Herein, two types of oxidation-reduction reactions related to chloride ions can be specifically represented by Reaction Formula 1 and Reaction Formula 2.

[Reaction Scheme 1]

[Reaction Scheme 2]

An electrochemical analysis method for confirming the two types of oxidation-reduction reactions may be, for example, cyclic voltammetry (CV) or chronoamperometry, but is not limited thereto. For example, if two types of oxidation-reduction peaks appear in the CV analysis graph, it can be determined that a hydrophobic interfacial layer with depleted water is formed. In addition, if a section in which the current density value is maintained as the voltage increases appears twice in the chronoamperometric graph, it can be considered that the above two types of oxidation-reduction reactions have occurred, and accordingly, it can be determined that a hydrophobic interfacial layer is formed.

In general, chloride ions in organic solvents show two types of oxidation-reduction reactions in Reaction Formula 1 and Reaction Formula 2 ($Cl^- \leftrightarrow Cl_3^- \leftrightarrow Cl_2$). On the other hand, since $Cl_3^-$ is not stabilized in an aqueous solution, only one type of oxidation-reduction reaction occurs ($Cl^- \leftrightarrow Cl_2$), and since the water-in-salt electrolyte is also an aqueous solution, only one type of oxidation-reduction reaction appears. However, when a specific electrode is applied to the water-in-salt electrolyte system, the fact that two types of oxidation-reduction reactions of chloride ions are detected in the state in which a voltage is applied is interpreted as meaning that the chloride ions are involved in the hydrophobic interfacial layer and thus it can be determined that a hydrophobic interface layer in which water is excluded is formed. Details proving this will be described in detail in the examples below.

For example, if the hydrophobic interfacial layer with depleted water is not formed, the $Cl_3^-$ ions cannot be stabilized in the water-in-salt electrolyte, which is an aqueous solution, and therefore only one type of oxidation-reduction reaction of $Cl^- \leftrightarrow Cl_2$ appears, and thus CV In the graph, only one type of oxidation-reduction peak appears, and in the chronoamperometric graph, only one section where the current density is maintained as the voltage rises appears. Conversely, if the hydrophobic interfacial layer with depleted water is formed at the interface between the positively electrified electrode and the water-in-salt electrolyte, $Cl_3^-$ ions can be stabilized by the hydrophobic interfacial layer, and accordingly, It is understood that two types of redox reactions of Reaction Scheme 1 and Reaction Scheme 2 appear. In this case, two types of oxidation-reduction peaks appear in the CV graph, and it is confirmed that two current density maintenance sections appear in the chronoamperometric graph. The analysis method according to an embodiment may be an electrochemical analysis method that uses this principle to observe the oxidation-reduction transition after injecting chloride ions into the water-in-salt electrolyte system, thereby simply and accurately determining whether or not a hydrophobic interfacial layer is formed on the positively electrified electrode.

Whether or not the hydrophobic interfacial layer is formed on the positively electrified electrode can be an indicator of the performance of the aqueous battery, and the analysis method according to an embodiment is a simple method for confirming the presence or absence of the hydrophobic interfacial layer, and can be variously used in the aqueous battery system.

Since the interfacial layer is formed in a voltage applied state as described above, for example, the analysis method may proceed in a state in which a potential is applied in the voltage range of about +1V or more, for example, about 1V to about 5V, or about 1V to about 3V.

The interfacial layer may be referred to as a double layer formed by arranging anions and cations of the salt. As the voltage applied to the electrode increases, a degree of ordering of ions increases to form an interfacial layer. Accordingly, water molecules withdraw from the interface, and water can be expressed as being depleted or excluded from the interfacial layer. The strong interaction between the interfacial layer and chloride ions can also be demonstrated by XPS, which will be described in detail in the examples below. In the analysis method according to an embodiment, if two types of oxidation-reduction reactions related to chloride ions are confirmed, it means that a hydrophobic interfacial layer is formed, and at this time, the interfacial layer is said to include anions and cations of a salt and chloride ions.

The interfacial layer may have a thickness of about 0.1 nm to about 10 nm, for example, about 0.1 nm to about 5 nm, about 0.1 nm to about 3 nm, or about 0.1 nm to about 1 nm.

The solution containing the chloride ions may be, for example, an aqueous solution containing a chloride salt, such as HCl, LiCl, NaCl, KCl, $MgCl_2$, $CaCl_2$, or a combination thereof. The solution containing chloride ions may further contain $HClO_4$ or the like for pH control. In addition, a molar concentration of the solution containing the chloride ions is not particularly limited, but may be, for example, about 10 mM to about 100 mM, about 20 mM to about 80 mM, or about 30 mM to about 70 mM.

Hereinafter, examples of the present invention, comparative examples, and evaluation examples thereof are described. The following examples are only examples of the present invention, and the present invention is not limited to the following examples.

1. CV Evaluation for Pt and GC Electrodes

Example 1

A glassy carbon (GC) macrodist electrode having a diameter of 3 mm is prepared as a working electrode, Ag/AgCl (1M KCl) is prepared as a reference electrode, and a Pt wire is prepared as a counter electrode. Aqueous electrolytes of various concentrations are prepared by adding LiTFSI to a distilled water solvent to have a molality of 0.5 m, 6 m, 12 m, and 18 m. Here, an electrolyte having a molality of 5 m or more corresponds to a water-in-salt electrolyte. A battery cells is prepared by injecting the prepared three electrodes and electrolyte into the battery case.

Example 2

A battery cell is prepared in the same manner as in Example 1, except that LiOTf is used instead of LiTFSI.

Reference Example 1

A battery cell is prepared in the same manner as in Example 1, except that a Pt macrodist electrode having a diameter of 2 mm is used as the working electrode.

Evaluation Example 1

Figure 1:
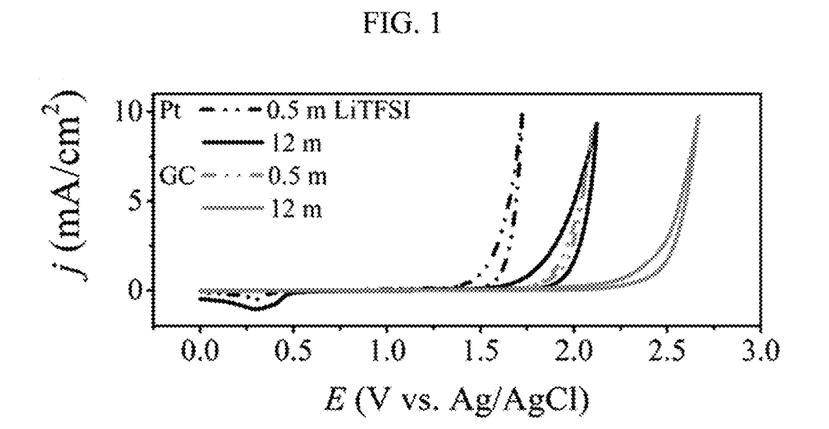
FIG. 1 is a graph showing cyclic voltammetry (CV) analyses in LiTFSI electrolytes at concentrations of 0.5 m and 12 m for Example 1 (GC electrode) and Reference Example 1 (Pt electrode).

After preparing battery cells using each 0.5 m and 12 m LiTFSI electrolyte in Example 1 and Reference Example 1, a cyclic voltammetry (CV) analysis thereof is performed, and the results are shown in FIG. 1. Referring to FIG. 1, the GC electrode of Example 1 at a low molality of 0.5 m exhibits sharply increased anodic current density (j) related to an oxygen evolution reaction (OER) at 1.85 V, which is 0.41 V higher than that of the Pt electrode of Reference Example 1, and the reason is because a kinetic barrier to OER at the GC electrode is higher than at the Pt electrode. At the morality of 12 m corresponding to a water-in-salt electrolyte, both Example 1 and Reference Example 1 exhibit all increased anodic overpotential of OER, compared with the morality of 0.5 m, which is the same result as previously known.

Figure 2:
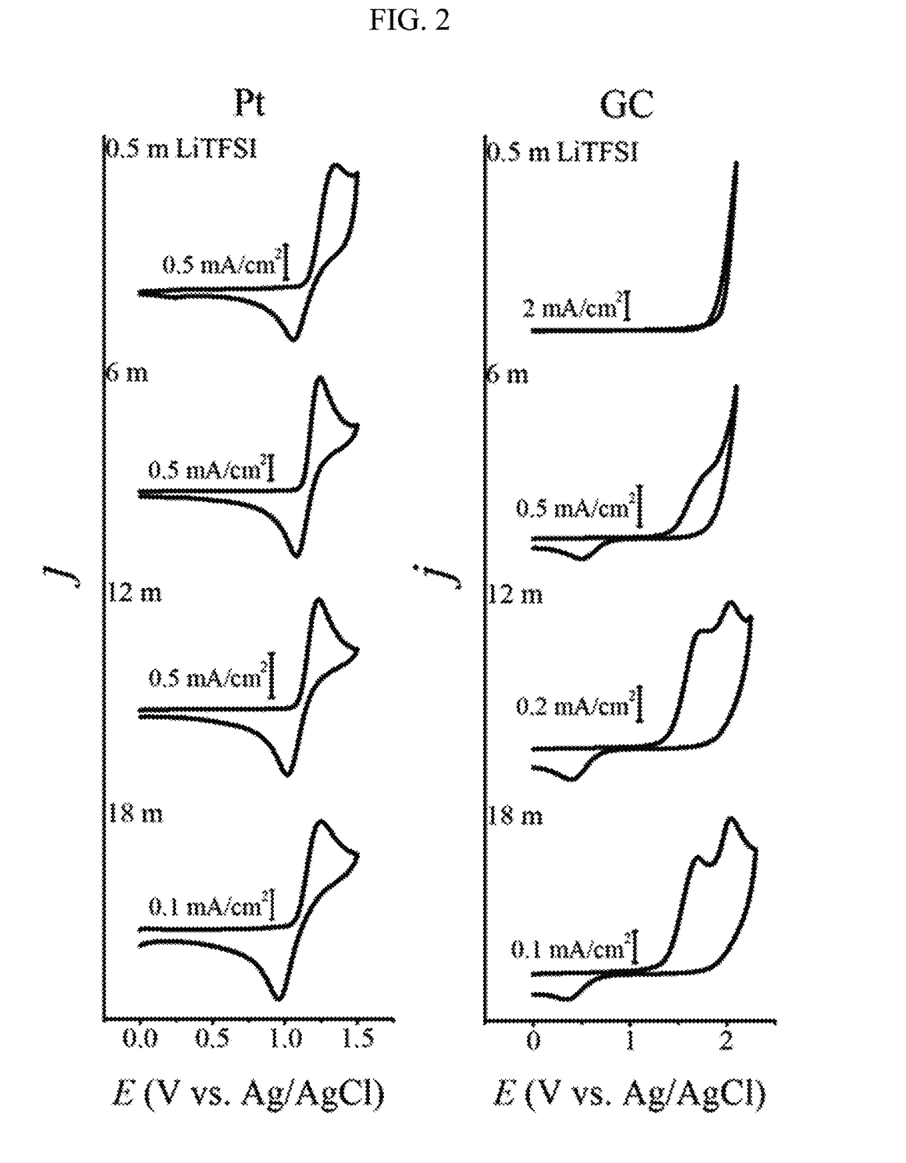
FIG. 2 is a CV graph obtained by injecting 50 mM HCl into electrolytes having various molality prepared in Example 1 (GC electrode) and Reference Example 1 (Pt electrode) and then analyzing them.

2. Analysis of Oxidation-Reduction Reaction of Chloride Ions in Water-In-Salt Electrolyte System After preparing each battery cell by adding 50 mM HCl to the electrolytes with various molalities according to Example 1 and Reference Example 1, the CV analysis is performed, and the results are shown in FIG. 2. The CV analysis is performed by using DigiElch Professional v6.F software (ElchSoft.com). Herein, instead of the 50 mM HCl, a mixed solution of 25 mM HCl and 25 mM $HClO_4$ or a mixed solution of 50 mM HCl and 25 mM LiCl may be used. The analysis result of the Pt electrode of Reference Example 1 is shown on the left of FIG. 2, which exhibits two voltage current peaks corresponding to one oxidation-reduction from 0.5 m to 18 m. These two peaks respectively correspond to an electro-oxidation of $Cl^-$ into $Cl_2$ and an electroreduction of $Cl_2$ into $Cl^-$, respectively. The analysis result of the GC electrode of Example 1 is shown on the right of FIG. 2. At 0.5 m, the graph looks only increasing by OER, but at 6 m, a new peak appears at 1.72 V, and two types of oxidation-reduction peaks appear in water-in-salt electrolyte systems of 12 m and 18 m in the forward scan. These correspond to two types of oxidation-reduction reactions of oxidation of $Cl^-$ into $Cl_3^-$ (Reaction Scheme 1) and subsequently, oxidation of $Cl_3^-$ to $Cl_2$ Reaction Scheme 2). This is in contrast to only one oxidation-reduction peak ($Cl^-/Cl_2$) at the Pt electrode.

In the water-in-salt electrolyte system, since a hydrophobic interfacial layer at the GC electrode, unlike the Pt electrode, strongly contains $Cl^-$, and in the hydrophobic interfacial layer, $Cl_3^-$ is understood to be thermodynamically stabilized. Accordingly, the interfacial layer of the Pt electrode is not hydrophobic, that is, no hydrophobic interfacial layer is formed at the Pt electrode, but the interfacial layer of the GC electrode is hydrophobic, that is, the hydrophobic interfacial layer excluding water is formed at the GC electrode, which is confirmed by the experiment. Accordingly, it may be confirmed whether or not a hydrophobic interfacial layer is formed at a positively electrified electrode by using chloride ions in a water-in-salt electrolyte system.

3. Voltage-Driven $Cl^-/Cl_3^-/Cl_2$ Oxidation-Reduction Reactions Exhibiting Interfacial Layer in Water-In-Salt Electrolyte System.

According to previous studies, $Li^+$, $TFSI^-$, and water molecules are included in the interfacial layer, for example, a layered $[Li(H_2O)_x]^+$-$[TFSI]^-$ network is thought to form. When a positive potential of +2 V is applied, $TFSI^-$ is first absorbed onto the electrode surface, and then, $Li^+$ exists above the anions. The water molecules, unlike these ions, are pushed away from the LiTFSI-induced interfacial layer. And the higher the potential, the more ordered the cation-anion network in the interfacial layer, and the higher the ordering, the more strongly the negatively charged Cl ($Cl^-$, $Cl_3^-$) interacts with $[Li(H_2O)_x]^+$. Since $Cl^-$ is electrochemically oxidized from 2.1 V (vs. PZC) at the GC electrode, in this potential region, the cation-anion network may be further aligned, while the water molecules are further pushed away, increasing affinity of the interfacial layer with $Cl^-$ and $Cl_3^-$, which are confirmed from the two types of oxidation-reduction peaks related to chloride ions in the voltage current analysis.

Figure 3:
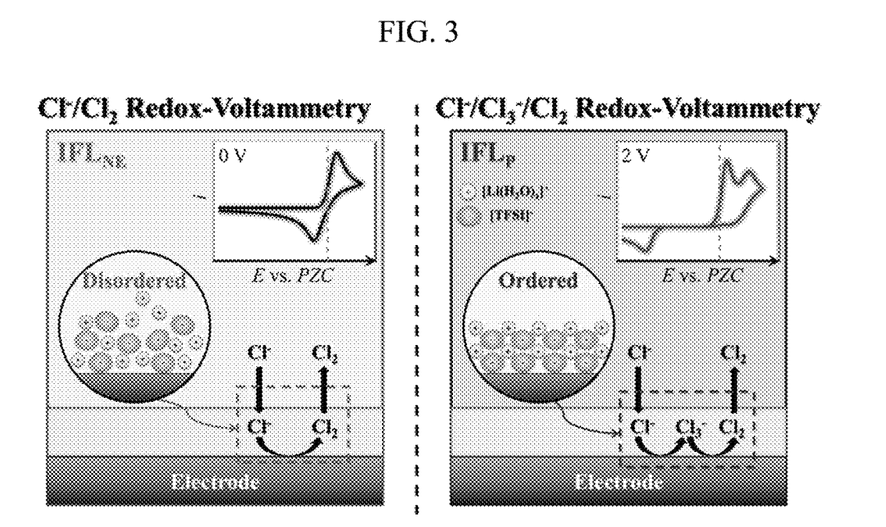
FIG. 3 is schematic views showing differences in oxidation-reduction reaction of chloride ions in the interfacial layer according to the potential difference (0 V on the left and 2 V on the right), and the graph at the top right of each drawing is a CV graph showing peaks related to chloride ions.

FIG. 3 is views schematically showing the differences in oxidation-reduction reaction of chloride ions in the interfacial layer according to the difference in potential, for better understanding. The left view of FIG. 3 shows that cations and anions are not ordered on the electrode surface to which no potential or a low potential (vs. PZC) is applied in the water-in-salt electrolyte system, wherein one type of chloride ion oxidation-reduction reaction ($Cl^-/Cl_2$) occurs. The right view of FIG. 3 shows that the cations and anions are aligned on the interfacial layer of an electrode to which a positive potential of about +2 V is applied, and in the interfacial layer, two types of $Cl^-/Cl_3^-/Cl_2$ oxidation-reduction reactions occur.

4. Evaluation of OER Overpotential Changes Through LSV Analysis

Figure 4:
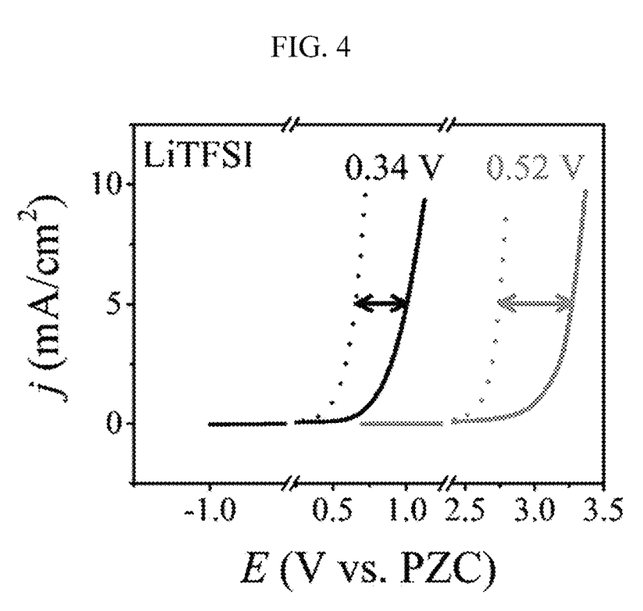
FIG. 4 is a linear sweep voltammetry (LSV) analysis graph related to OER (Oxygen Evolution Reaction) in LiTFSI electrolytes at concentrations of 0.5 m and 12 m for Example 1 (GC electrode) and Reference Example 1 (Pt electrode).

The phenomenon that water is excluded from the interfacial layer may be confirmed through the fact that the anodic overpotential due to OER increases, as the concentration of the electrolyte increases closer to the water-in-salt electrolyte. FIG. 4 is a graph of linear sweep voltammetry (LSV) analysis results related to OER at the Pt and GC electrodes in the 0.5 m and 12 m LiTFSI aqueous solutions. A black graph on the left of FIG. 4 shows the result of a Pt electrode, and a red graph on the right of FIG. 4 shows the result of a GC electrode, wherein a dotted line graph shows the result at a concentration of 0.5 m, and a solid line graph shows the result at a concentration of 12 m.

Referring to FIG. 4, as molality of a salt increases, an overpotential by OER increases by 0.34 V at the Pt electrode but by 0.52 V at the GC electrode. In other words, the overpotential at the GC electrode increases 1.5 times of that at the Pt electrode in the water-in-salt electrolyte. Accordingly, the interfacial layer at the GC electrode functions as a greater kinetic barrier to OER.

5. Comparison with Other Halide Ions (Br, I)

Comparative Example 1

Figure 5:
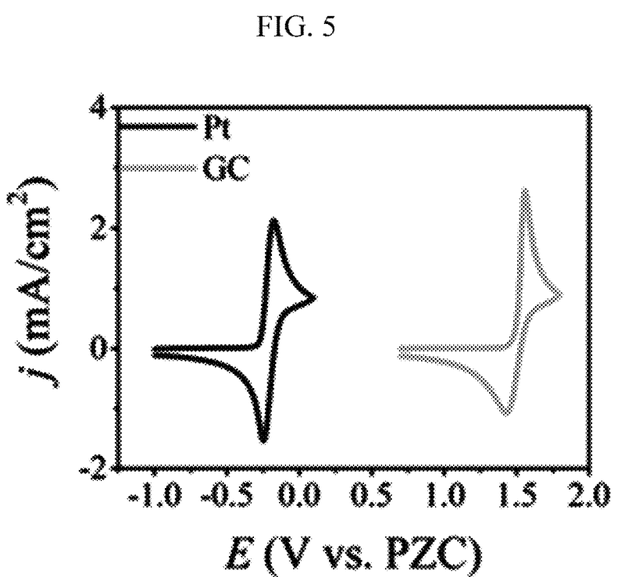
FIG. 5 is a CV analysis graph after adding HBr to 12 m water-in-salt electrolytes of Example 1 (GC electrode) and Reference Example 1 (Pt electrode).

A CV analysis is performed by using the GC electrode as an operation voltage in the same manner as in Example 1 but a 12 m water-in-salt LiTFSI electrolyte prepared by adding 50 mM HBr instead of HCl. Similarly, the CV analysis is performed by using a Pt electrode in the same manner as in Reference Example 1 but using a 12 m water-in-salt LiTFSI electrolyte prepared by adding 50 mM HBr instead of HCl. In FIG. 5, a black graph on the left shows the CV analysis result of the Pt electrode, and a red graph on the right shows the CV analysis result of the GC electrode.

Referring to FIG. 5, at the GC electrode, two voltammetry peaks corresponding to one oxidation-reduction reaction appear, which is similar to the graph of the Pt electrode. The reason is that Bra is unstable at both the Pt electrode and the GC electrode. In other words, although a hydrophobic interfacial layer is formed at the GC electrode, since Bra ions are not stabilized, a $Br/Br_3^-/Br_2$ oxidation-reduction reaction is not observed, but a $Br^-/Br_2$ oxidation-reduction reaction alone is observed. Accordingly, it is impossible to determine whether the hydrophobic interfacial layer is formed or not through bromine ions unlike chloride ions. The reason is that a stabilization degree in an aprotic solvent varies depending on types of halide ions in order of $I_3^- < Br_3^- < Cl_3^-$.

Comparative Example 2

Figure 6:
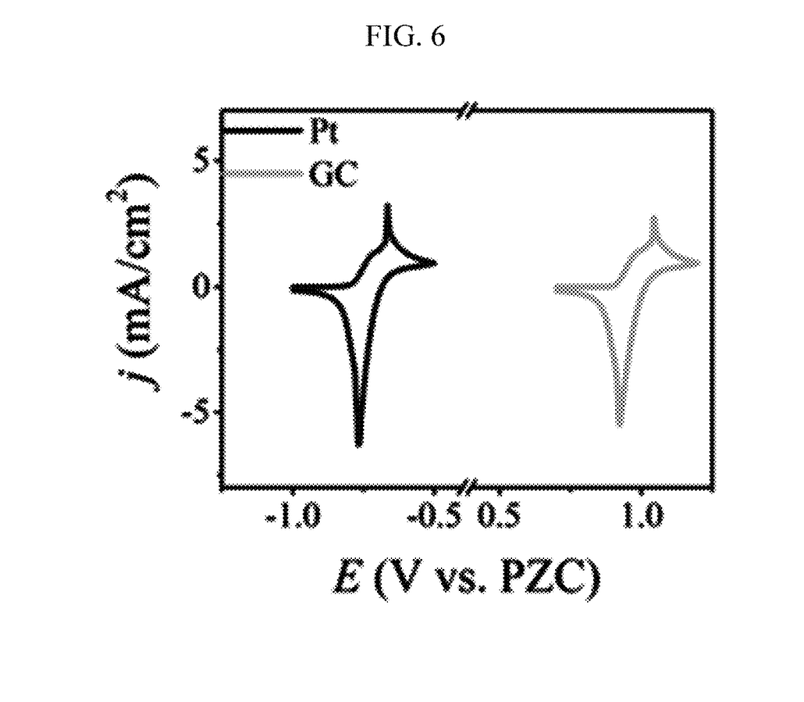
FIG. 6 is a CV analysis graph after adding HI to 12 m water-in-salt electrolytes of Example 1 (GC electrode) and Reference Example 1 (Pt electrode).

A CV analysis is performed by using the GC electrode in the same manner as in Example 1 but using a 12 m water-in-salt LiTFSI electrolyte prepared by adding 50 mM of HI instead of HCl. Similarly, the CV analysis is performed by using the Pt electrode in the same manner as in Reference Example 1 but using a 12 m water-in-salt LiTFSI electrolyte prepared by adding 50 mM of HI instead of HCl. In FIG. 6, a black graph on the left shows the CV analysis result of the Pt electrode, and a red graph on the right shows the CV analysis result of the GC electrode.

Referring to FIG. 6, the same CV shape appears at the two different types of the Pt and GC electrodes. In other words, although a hydrophobic interfacial layer is formed at the GC electrode, since $I_3^-$ ions are not stabilized, a $I^-/I_3^-/I_2$ oxidation-reduction reaction is not observed, but a $I^-/I_2$ oxidation-reduction reaction alone appears. Accordingly, through iodine ions, it is impossible to check whether or not the hydrophobic interfacial layer is formed.

In conclusion, the hydrophobic interfacial layer is impossible to recognize by bromine ions and iodine ions among halide ions in a water-in-salt electrolyte system. Since chloride ions alone show two types of oxidation-reduction reactions in a hydrophobic interfacial layer, whether or not the hydrophobic interfacial layer is formed may be checked only through the chloride ions.

Figure 7:
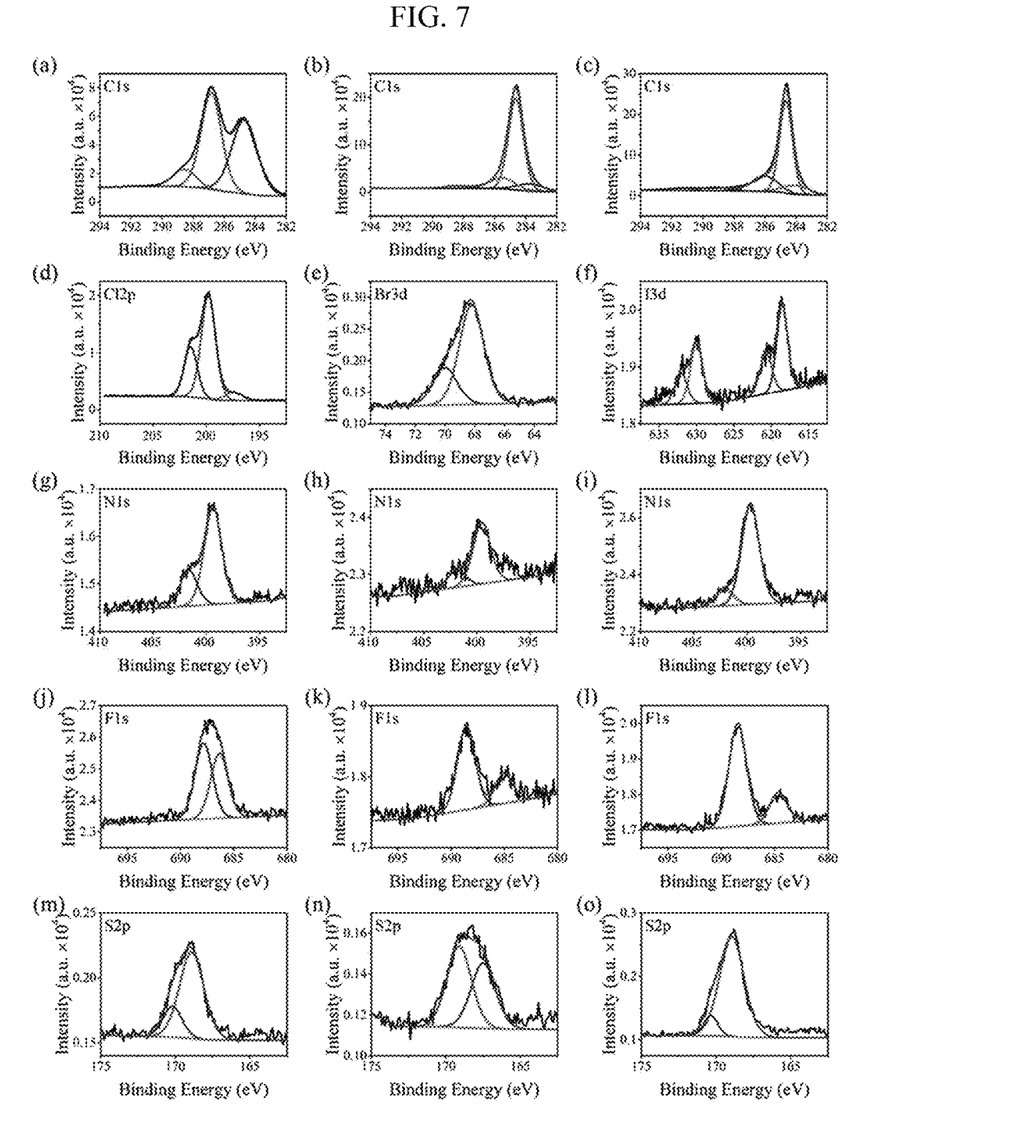
FIG. 7 shows X-ray photoelectron spectroscopy (XPS) analyses after electrochemical treatment of the GC electrode of Example 1 in a 12 m water-in-salt electrolyte containing halides (Cl—, Br—, and I—).

6. Ex-Situ XPS Evaluation to Demonstrate Interaction of Chloride Ions with Interfacial Layer An interaction of Cl⁻ and $Cl_3^-$ with an interfacial layer may also be checked through an XPS analysis. In a 12 m LiTFSI water-in-salt electrolyte containing 50 mM halide (Cl⁻, Br⁻, or I⁻), the GC electrode is electrochemically treated by applying a constant potential for 1000 seconds. Subsequently, the XPS analysis (Nexsa; monochromatic Al Kα X-ray source 1486.7 eV, Thermo Scientific Co.) is performed on each electrode, and the results are shown in FIG. 7.

The electrodes electrochemically treated in each halide-containing water-in-salt electrolyte are analyzed with respect to a peak in a spectrum for each element to perform a qualitative and quantitative analysis of elements remaining in the electrodes. The top row of FIG. 7 shows a C 1s spectrum result according to types of halide, wherein a C—Cl peak appears at 286.8 eV and 288.5 eV, but a C—Br, C—I peak is not observed. This result qualitatively proves that the chloride ions alone among several halides cause strong interactions with the GC electrode. In addition, the chloride ions, which are confirmed above through the C 1s spectrum, may also be reconfirmed through a Cl 2p spectrum, wherein 0l3 is the most stably present at the electrode, referring to relative intensity of the peaks at 197.4 eV, 199.8 eV, and 201.5 eV respectively corresponding to Cl⁻, $Cl_3^-$, and $Cl_2$. When bromine ions and iodine ions are used, peaks of $Br_3^-$ and $Br_2$ are found at 68.2 eV and 70.0 eV in each Br 3d and I 3d spectrum, and $I_3^-$ and $I_2$ peaks are found at 618.5 eV, 620.6 eV (I $3d_{5/2}$), 630.0 eV, and 632.1 eV (I $3d_{3/2}$) but these peaks are negligible, compared with the peaks related to chloride ions in terms of intensity.

Figure 8:
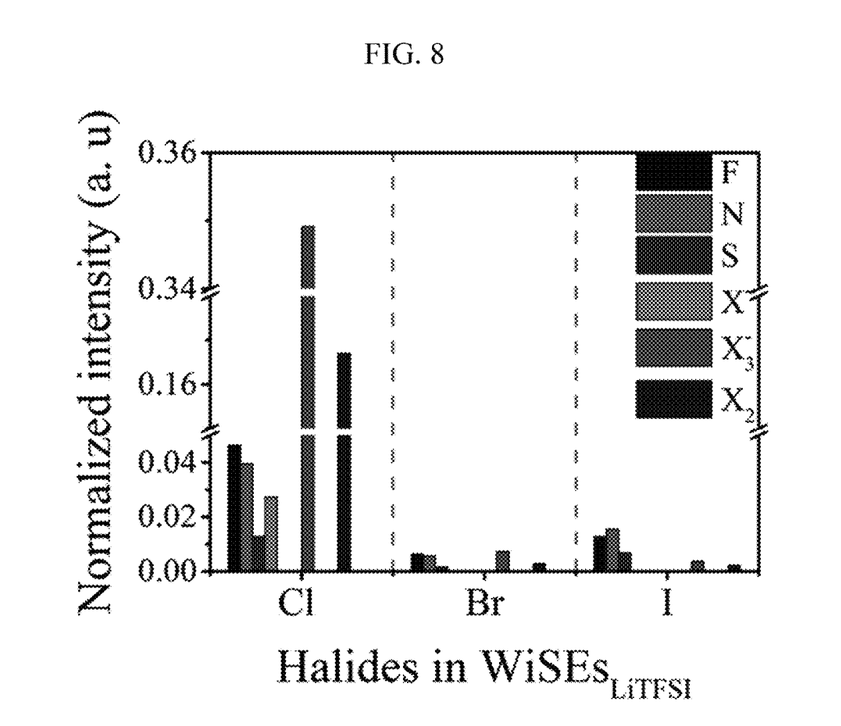
FIG. 8 is a graph comparing peak intensities of F, N, S, $X^-$, $X_3^-$, and $X_2$ for each type of halide in FIG. 7, where X denotes a corresponding halide element.

In order to quantitively analyze each element, intensity of the peaks are compared, and the results are shown in FIG. 8. In order to compensate possible errors of each electrode sample, based on intensity of the C—C peak at 284 eV in the C 1s spectrum of each electrode, intensity of each halide-related peak is compared to express a histogram for each halide, and in addition, intensity of F, N, and S elements originated from TFSI⁻ anions and commonly included in all types of the electrolytes is expressed as the histogram. Referring to FIG. 8, the F, N, and S element peaks show the greatest intensity at the electrodes treated with an electrolyte including chloride ions rather than bromine and iodine ions, and the chlorine (Cl⁻, $Cl_3^-$, $Cl_2$) peaks show the greatest intensity among the several halide peaks.

In summary, compared with bromine ion and iodine ions, chloride ions have strong interactions with an interfacial layer of an electrode and may leave trace on the electrode, even when a voltage is not applied thereto, so that XPS measurement and analysis may be performed.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. An electrochemical analysis method for recognizing whether a hydrophobic interfacial layer of a positively electrified electrode is formed, said electrochemical analysis method comprising:
adding a solution containing chloride ions to a water-in-salt electrolyte that contacts an electrode;
positively electrifying the electrode by applying a positive voltage referring to a point of zero charge of the electrode;
measuring a resulting current as a function of time or potential from the positively electrified electrode; and
determining that the hydrophobic interfacial layer is formed on the positively electrified electrode if a first oxidation-reduction reaction and second oxidation-reduction reaction related to the chloride ions are confirmed from the measured current, wherein the water-in-salt electrolyte includes an aqueous solvent and a salt, and a ratio of the weight of the salt to the weight of the aqueous solvent is about 1 or more.

2. The electrochemical analysis method of claim 1, wherein
the first and second oxidation-reduction reactions are represented by Reaction Formula 1 and Reaction Formula 2:

$$Cl_3^- + 2e^- \Leftrightarrow 3Cl^-$$ [Reaction Scheme 1]

$$3Cl_2 + 2e^- \Leftrightarrow 2Cl_3^-.$$ [Reaction Scheme 2]

3. The electrochemical analysis method of claim 1, wherein the first and second oxidation-reduction reactions are confirmed by performing a cyclic voltammetry analysis to confirm two types of oxidation-reduction peaks or performing a chronoamperometry analysis to confirm that a section in which the current density value is maintained as the voltage increases appears twice.

4. The electrochemical analysis method of claim 1, wherein the positively electrified electrode is an electrode to which a potential of about +1 V to about +5 V is applied.

5. The electrochemical analysis method of claim 1, wherein the hydrophobic interfacial layer exists only when an electrode potential is more positively applied than its point of zero charge.

6. The electrochemical analysis method of claim 1, wherein
the hydrophobic interfacial layer is a layer in which anions and cations of the salt of the water-in-salt electrolyte are ordered.

7. The electrochemical analysis method of claim 1, wherein a thickness of the hydrophobic interfacial layer is about 0.1 nm to about 10 nm.

8. The electrochemical analysis method of claim 1, wherein
if the first and second oxidation-reduction reactions are confirmed, the hydrophobic interfacial layer include anions and cations of a salt of the water-in-salt electrolyte and additionally comprises chloride ions.

9. The electrochemical analysis method of claim 1, wherein the molality of the water-in-salt electrolyte is about 5 m to about 50 m.

10. The electrochemical analysis method of claim 1, wherein in the water-in-salt electrolyte, the salt is lithium bis(trifluoromethanesulfonyl) imide (LiTFSI), lithium trifluoromethanesulfonate (LiOTf), or a combination thereof.

11. The electrochemical analysis method of claim 1, wherein the solution containing chloride ions is an aqueous solution including HCl, LiCl, NaCl, KCl, $MgCl_2$, $CaCl_2$, or a combination thereof.

12. The electrochemical analysis method of claim 1, wherein a molar concentration of the solution containing chloride ions is about 10 mM to about 100 mM.

13. The electrochemical analysis method of claim 1, wherein the battery system is a rechargeable lithium battery, a lead acid battery, a redox flow battery, a fuel cell, a capacitor, or an electrolysis device.

\* \* \* \* \*